Jan. 11, 1966
W. C. MOOG, JR
3,228,423
FLUID CONTROL VALVE IN WHICH A MECHANICAL
MOTION IS TRANSMITTED FROM A DRY REGION
TO A PRESSURIZED FLUID FILLED REGION
Filed Jan. 23, 1956
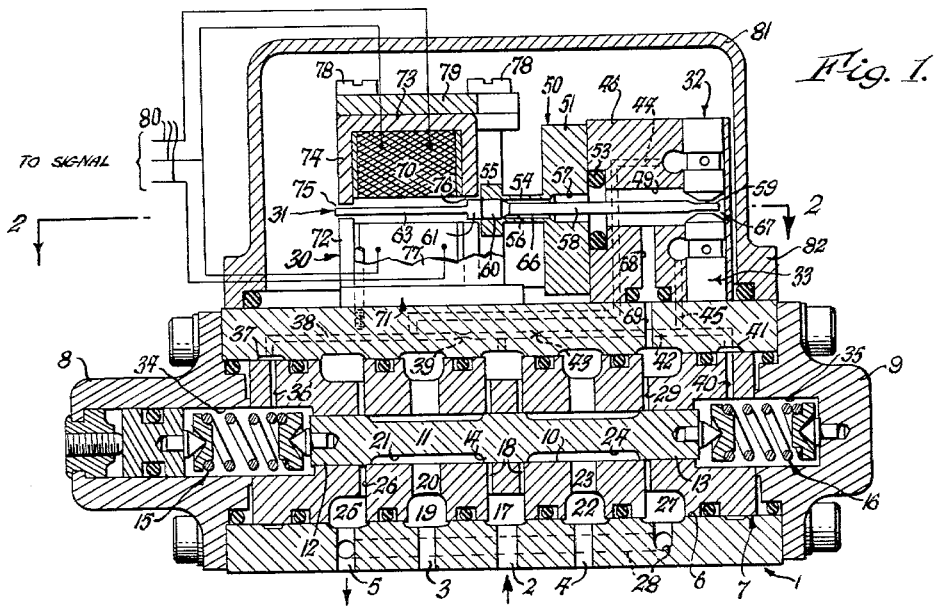
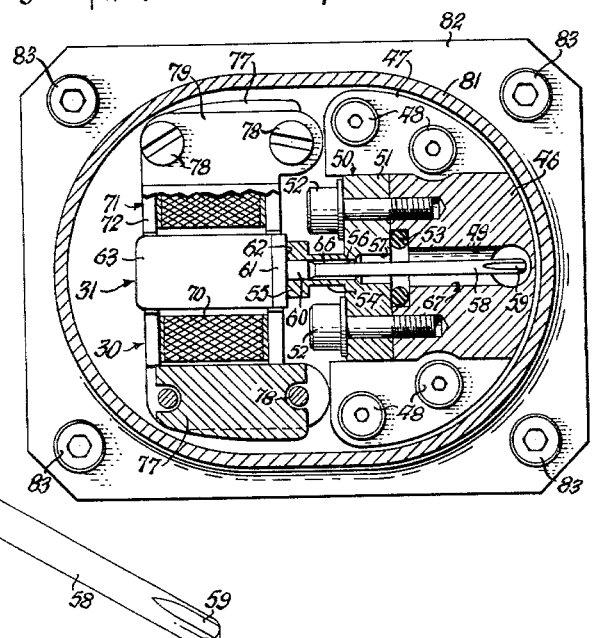
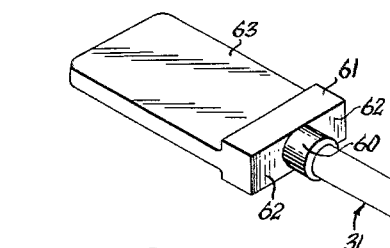
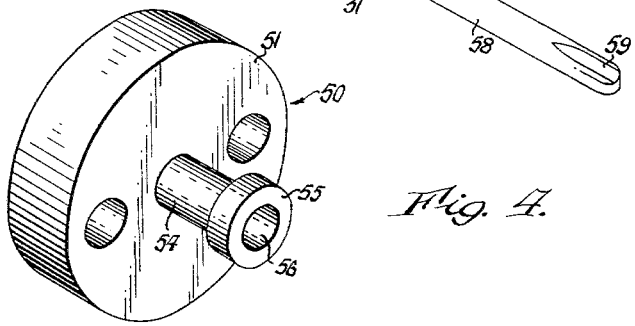
INVENTOR.
William C. Moog, Jr.
BY Popp and Sommer
ATTORNEYS.

United States Patent Office 3,228,423
Patented Jan. 11, 1966

3,228,423
FLUID CONTROL VALVE IN WHICH A MECHANICAL MOTION IS TRANSMITTED FROM A DRY REGION TO A PRESSURIZED FLUID FILLED REGION
William C. Moog, Jr., East Aurora, N.Y., assignor to Moog Servocontrols, Inc., a corporation of New York
Filed Jan. 23, 1956, Ser. No. 560,573
18 Claims. (Cl. 137—625.62)

This invention relates to improvements in fluid control valves, particularly of the servo type.

The principal object of the present invention is to provide a fluid control valve in which a mechanical motion is transmitted from a dry region to a pressurized fluid filled region. By "dry region" is meant a closed or open chamber filled with atmospheric air or other gas, as distinguished from a liquid filled chamber; and by "pressurized fluid filled region" is meant a chamber filled with either a liquid or gas under a pressure higher than that which obtains in said dry region. The advantage of such a valve is to permit the means for applying a control force to the valve, regardless of whether such force is electrically, mechanically or pneumatically induced, to be isolated from the pressurized fluid being handled by the valve.

Another important object is to provide such a valve in which the mechanical motion transmission means are so constructed as to be capable of withstanding a high pressure differential between the dry and fluid filled regions, in the order of several thousand pounds per square inch.

Valves of the class to which this invention relates are sensitive and are desired to have linearity of response, that is, an output proportional to input over a wide range. The introduction or varying of frictional forces over part or all of the operating range of the valve is obviously undesirable since the linearity of response of the valve is destroyed. This undesirable result is avoided in accordance with the present invention by rigidly mounting a rigid beam member intermediate its ends on the closed end of a flexure tube so arranged that its interior is filled with the pressurized fluid thereby placing said tube in tension so as to utilize its maximum strength and yet allowing said tube to flex or bend in response to an input force applied to that part of the beam arranged exteriorly of said tube. In this manner the rigid beam member has a frictionless pivotal mounting so that mechanical motion can be transmitted by the member from a dry region to a pressurized fluid filled region.

The present improvements have particularly advantageous application to electro-hydraulic servo valves of the type shown in my prior Patent No. 2,625,136 and my application copending herewith identified as Serial No. 356,631, filed May 22, 1953 and entitled Electro-Hydraulic Servo Valve Mechanism, now Patent No. 2,767,689. In both of the servo valves disclosed in the aforesaid patent and application, the fluid, usually hydraulic oil, is discharged into a chamber which also houses the actuating motor. As a result, the actuating motor is submerged or immersed in hydraulic fluid, and can be referred to as a wet motor. Such an arrangement has disadvantages, principal among which is that metal particles contained within the hydraulic fluid and discharged by the nozzles are magnetically attracted to the pole pieces of the actuating motor and tend to build up on the ends of the pole pieces so as to reduce the size of the air gap therebetween. Such a build-up of metal particles on the pole pieces affects the performance of the servo valve and is undesirable. It has been found that, notwithstanding the provision of elavorate filtering means, either of a mechanical or magnetic type such as disclosed in my aforesaid application Serial No. 356,631, the hydraulic fluid is not cleaned sufficiently so that the metal particles which escape being filtered out tend to collect on the pole pieces and close the air gap. Moreover, the hydraulic fluid may be corrosive to the actuating motor and such a situation is undesirable.

The foregoing disadvantages of wet motor electro-hydraulic servo valves have been overcome by my present invention which, generally speaking, provides a dry motor, that is, an actuating motor which is isolated from the fluid discharged by the nozzles and thereby metal particles within the fluid cannot collect on the pole pieces to narrow the size of the air gap and also the fluid cannot contact the motor for possible corrosive action thereon.

In its preferred application to an electro-hydraulic servo valve, the objectives of the present invention are achieved by providing an armature for a dry torque motor and which, through a sealed and frictionless pivot, actuates a flapper associated with one or more fluid nozzles which in turn have an operative association with the valve spool. In avoiding the disadvantages of the prior wet motor type of electro-hydraulic servo valve, the dry motor type valve retains the same operational characteristics and sensitivity of performance.

The foregoing and other objects and advantages of the present invention will be apparent from the following detailed description and accompanying drawings wherein like reference numerals are used to denote like parts throughout the various views and wherein:

FIG. 1 is a vertical central sectional view through an electro-hydraulic servo valve embodying the present invention.

FIG. 2 is a horizontal transverse section thereof, taken on line 2—2, FIG. 1.

FIG. 3 is an enlarged perspective view of a pressure regulator member which forms an essential element of the improvement of the present invention.

FIG. 4 is an enlarged perspective view of the flexure tube which cooperates with the pressure regulator member shown in FIG. 3.

Referring to the accompanying drawing in which a preferred embodiment of the present invention is illustrated, there is shown a valve body, generally designated 1, preferably formed of aluminum and provided on its bottom face with a pressure fluid supply port shown at 2, pressure fluid control ports 3 and 4, and a fluid drain port 5. Ports 3 and 4 serve to connect the valve with a mechanism to be operated thereby, which mechanism may be a double acting piston device (not shown herein but illustrated in my said copending application Serial No. 356,631), or other type of hydraulic motor.

Pressure supply port 2 is adapted for communication with a pressure fluid pump (not shown herein but illustrated in my said copending application Serial No. 356,631) which is arranged to deliver fluid under the desired pressure to this port. Such fluid pump is supplied return fluid from the drain port 5 which has a suitable connection therewith.

The valve body 1 is shown as provided with a horizontal bore 6 in which a bushing assembly, indicated generally at 7, is arranged. Such bushing assembly is shown and described in detail in another one of my copending applications, the same being identified as Serial No. 371,933, filed August 3, 1953, now Patent No. 2,920,650 and entitled Valve Bushing. Inasmuch as the details of the valve bushing form no part of the present invention, the same will not be redescribed extensively in the present application. Also, as is old with my prior devices, the bushing assembly 7 is held within the bore 6 of the valve body by end caps 8 and 9, the details of which are also described in my aforesaid copending application Serial No. 371,933 and hence will not be repeated here.

As is also described in my aforesaid copending application Serial No. 371,933, the bushing assembly 7 is provided with a central horizontally extending bore 10 in which a valve spool, indicated generally at 11, is slidably arranged. This valve spool 11 is shown as having two end lobes 12 and 13, one at each end, and a central lobe 14, and is adapted to be mechanically positioned in a predetermined position relative to the bushing assembly 7 by spring assemblies 15 and 16 arranged at opposite ends of the valve spool. The spring assembly 15, at one end, is shown as being adjustable, in the manner described in my aforesaid copending application Serial No. 356,631. The bushing and valve spool are preferably formed of a hardened steel.

The supply port 2 is shown as being in communication with an annular chamber 17 having branch passages 18 leading radially inwardly therefrom to the bore 10 and normally covered by the central lobe 14 of the valve spool. The control port 3 is shown as being in communication with an annular chamber 19 having radially inwardly extending branch passages 20 leading to the bore 10 and communicating with the annular space 21 around the reduced portion of the valve spool between the lobes 12 and 14 thereof. The control port 4 is shown as communicaitng with an annular chamber 22 having radial branch passages 23 extending inwardly to the bore 10 and communicating with the annular space 24 around the reduced portion of the valve spool between the lobes 13 and 14 thereof.

Adjacent the end lobe 12 on the valve spool, the bushing assembly 7 is shown as being formed to provide an annular chamber 25 which communicates with the drain port 5 and which also has radial passages 26 leading inwardly therefrom to the bore 10, the inner ends of these radial passages being normally closed by the periphery of the end lobe 12 of the valve spool. At the opposite end of the valve, and adjacent the lobe 13 on the valve spool, the bushing assembly is shown as provided with an annular chamber 27 which communicates with the drain port 5 through the branch passage 28. Radial passages 29 lead from the annular chamber 27 inwardly to the bore 10 and the inner ends of these radial passages are normally covered by the right hand lobe 13 of the valve spool.

It will be seen that if the valve spool is shifted to the right from the position shown in FIG. 1, pressure port 2 and control port 3 will be placed in communication, whereas control port 4 and drain port 5 will be placed in communication. Alternately, when the valve spool is shifted to the left, pressure port 2 and control port 4 will be placed in communication, whereas control port 3 and drain port 5 will be placed in communication.

In accordance with the principle of operation of an electro-hydraulic servo valve of the type in question, the valve spool 11 is caused to be shifted from a predetermined mechanically induced centered position to a hydraulically displaced position in response to an electrical signal impressed upon the actuating motor of the valve, the sense of the signal determining the direction of movement of the valve spool, that is, either to the left or to the right, and the strength of the electrical signal determining the extent of displacement so that the displacement of the valve spool will be proportional to the strength of the electrical signal applied to the motor.

To this end, there is provided a torque motor, indicated generally at 30, which controls a hydraulic amplifier including a pressure regulator member, indicated generally at 31, and a pair of nozzles indicated generally at 32 and 33, respectively. The nozzles 32 and 33 are severally in communication with chambers 34 and 35 at opposite ends of the valve spool 11, these chambers being exposed to the respective ends of the valve spool and housing the spring assemblies 15 and 16, respectively.

The feature of the present invention is to isolate the torque motor 30 from the hydraulic fluid circulated by the hydraulic amplifier. This is accomplished by employing part of the pressure regulator member 31 as an armature for the torque motor 30 and part as a flapper arranged between the nozzles 32 and 33, and mounting this member on a sealed and frictionless pivot, thus creating a pressure differential in the nozzles proportional to the electrical signal applied to the motor. This differential hydraulic pressure output is applied to the ends of the valve spool 11 in opposition to the return springs 15 and 16. This method of valve actuation results in exceptionally high level spool driving forces and thus minimizes the effect of spool friction and acceleration forces.

Turning now to a detailed description of structure for accomplishing the foregoing, the bushing assembly 7 adjacent the chamber 34 is formed with radial passages 36 which lead from this chamber to an annular groove 37, provided in the bore 6 of the valve body. This annular groove 37 communicates with the annular chamber 17 through the line 38 which has a restriction 39 therein. In similar manner, the valve bushing 7 adjacent its opposite end is provided with radial passages 40 which lead from the chamber 35 to an annular groove 41 provided in the bore 6 of the valve body. This annular groove 41 communicates with the annular chamber 17 through the line 42 which has a restriction 43 therein. The restrictions 39 and 43 serve to provide fluid in the chambers 34 and 35 at a pressure below that of the fluid introduced through the supply port 2. The circular discharge opening of the nozzle 32 is in communication with a branch line 44 which leads to the line 38 on the downstream side of the restriction 39. In similar manner, the circular discharge opening of the other nozzle 33 is in communication with a branch line 45 which leads to the line 42 on the downstream side of the restriction 43 therein.

In this manner, the chambers 34 and 35 are supplied with fluid under a lower pressure than that of the fluid introduced through the supply port 2 and further, the nozzles 32 and 33 communicate with the chambers 34 and 35, respectively, and therefore each nozzle has the same fluid pressure as its companion chamber.

The hydraulic fluid circulated by the servo valve is preferably internally filtered both by sintered bronze elements and by magnetic traps (not shown herein but disclosed in my said copending application Serial No. 356,631), or by other suitable means.

The nozzles 32 and 33 are shown as cylindrical devices arranged with their axes in vertical alignment and mounted in a support member 46 so that their discharge openings are opposed and in spaced relation to each other. The support member 46 has a laterally extending attaching flange 47 at its base on opposite sides thereof and is secured to the upper surface of the valve body 1 by attaching screws 48, four such screws being shown. The outer body portions of the nozzles 32 and 33 serve as plugs for the holes in the support member 46 in which these nozzles are inserted. The inner ends of the nozzles 32 and 33 are shown as projecting into a horizontally elongated recess 49 which is provided by drilling out the recess from the left hand side of the support member 46 as viewed in FIGS. 1 and 2.

The open outer end of the recess 49 is covered by a flexure tube or sleeve member, indicated generally at 50. This member 50 has a relatively thick annular base 51 which provides an attaching flange which abuts the flat left hand vertical end face of the support member 46, as shown in FIG. 2, and is secured thereto by the screws 52, two such screws being shown. The screws 52 are shown as passing through holes provided in the flange 51 of the sleeve member and screwed into threaded recesses provided in the body of the support member 46. To provide a seal for the joint between the sleeve and support members, the recess 49 of the latter is provided at its outer end with an enlarged counterbore to accommodate an O seal ring 53.

Extending axially to the left, as viewed in FIG. 1, from the attaching flange 51 of the sleeve member 50, is a thin walled cylindrical tube 54 having an enlarged, outwardly extending, annular collar 55 at its outer end. The collar 55, thin walled tube 54 and flange 51 of the sleeve member 50 are preferably formed as a one-piece part of a suitable metal, such as beryllium copper. The sleeve member 50 has a cylindrical bore 56 which is shown as having a uniform diameter extending from its outer end to a point part-way into the base portion 51 and thereafter continuing as an enlarged bore 57 which opens into the recess 49 of the support member 46.

The flexure tube or sleeve member 50 is closed at its outer end which on one side supports a flapper and on the other side an armature plate. While the outer end of the flexure tube may be closed in any suitable manner with the flapper and armature plate as separate members suitably rigidly mounted on opposite sides of the closed end, it is preferred to integrate the flapper and armature plate into the unitary pressure regulator member 31 shown and employ an intermediate portion of this member to close the end of the flexure tube. This member 31 is a rigid beam and, referring to FIG. 3, is shown as comprising a cylindrical bar portion 58 which has its outer and free end flattened on opposite sides as indicated at 59 so as to provide a flapper with flat and parallel upper and lower faces adapted to be arranged in the space between and opposing the openings of the nozzles 32 and 33. Each of the faces 59 has an area at least equal to the cross sectional circular area of the opposing nozzle opening so that these faces and nozzles jointly provide variable annular orifices discharging fluid into the recess 49. At the other end of the cylindrical bar portion 58, th member 31 is shown as being enlarged for a short axial length to provide a cylindrical plug portion 60. Immediately adjacent the plug portion 60, the member 31 is still further enlarged laterally to provide a rectangular transverse horizontal portion 61. The enlarged transverse portion 61 provides a pair of coplanar flat shoulders 62 on opposite sides of the plug portion 60. Extending centrally and horizontally from the opposite side of the rectangular transverse portion 61, the member 31 has a thinner rectangular plate portion 63 provided with flat and parallel upper and lower surfaces which are parallel with the flat faces 59 on the opposite end of this member.

The plug portion 60 of the pressure regulator member 31 has a press fit in the outer end of the bore 56 of the sleeve member 50 and the two parts are assembled together so that the shoulders 62 abut the outer end face of the collar 55 which reinforces the sleeve member at this place of connection between these two members. This provides a sealed connection.

Referring to FIGS. 1 and 2, it will be noted that, with the pressure regulator member 31 inserted in the sleeve member 50 as above described, the outer end of the bore 56 of the flapper sleeve is effectively closed and sealed by the plug portion 60 of the flapper, but an annular clearance 66 exists between the cylindrical bar portion 58 of the member 31 and the thin walled tube portion 54 of the sleeve member 50. This annular clearance or space 66 and the portion of the recess 49 in the support member 46, unoccupied by the cylindrical bar 58 of the flapper, provides a sump chamber 67 for the fluid discharged by the nozzles 32 and 33. The sump chamber 67 is in communication with the drain port 5 through a vertical drain passage 68 in the support member 46 and a registered vertical passage 69 in the valve body 1 which leads to the annular chamber 27 in the bushing assembly 7. As previously described, the annular chamber 27 is in communication with the drain port 5 through the branch passages 28.

It has been found that the plugging of the mouth portion of the bore 56 in the sleeve member 50 with the plug portion 60 of the pressure regulator member 31 provides an effective seal against the leakage of fluid from the sump chamber 67 while still permitting the thin walled tubular portion 54 of this sleeve member to flex or bend to provide the necessary operative range of oscillatory or pivotal movement of the flapper and armature as a rigid integral member. The thickness of the thin walled portion 54 of the sleeve member has been found satisfactorily strong to withstand pressures within the sump chamber 67 as high as 4500 pounds per square inch. It is to be noted that the thin walled tubular portion 54 is under tension when the pressure within the sump chamber 67 is higher than the pressure surrounding the exterior of this tubular portion 54, which outer pressure is usually atmospheric pressure, and this arrangement permits the flexure heretofore referred to without the thin walled portion contacting any part of the cylindrical bar portion 58 of the flapper. Thus, the pressure regulator member 31 extends through a tubular, sealed and frictionless pivot, with the portion of this member on one side of the pivot available for use as an armature of a torque motor and the portion of this member on the other side of the pivot available for use as a flapper to work in association with the fluid nozzles of the hydraulic amplifier.

The torque motor 30 is shown as comprising a coil 70 which surrounds the plate portion 63 of the pressure regulator member 31, which plate portion serves as the armature for the motor. The coil 70 is shown as being supported on the base part of a lower pole piece 71 having integral upturned flanges 72 which embrace the opposite ends of the coil 70 and extend partially upwardly along these ends. The coil is covered by an upper pole piece 73 having integral downturned flanges 74 which embrace the upper end portions of the coil. The opposing ends of the corresponding pairs of flanges 72 and 74 of the respective lower and upper pole pieces 71 and 73 are spaced apart and are only slightly wider than the armature plate 63 so as to provide a pair of air gaps 75 and 76. Arranged between the lateral base portions of the pole pieces 71 and 73, on opposite sides of the coil 70, are permanent magnets 77. The vertical end of each of these permanent magnets 77 is provided with a groove through which the shanks of fastening screws 78 extend, two such screws being shown for each magnet. A top plate 79 extends transversely across the upper pole piece 73 and the heads of the screws 78 bear against the upper surface thereof. The screws 78 extend through registered holes provided in the top plate 79, the pole pieces 71 and 73 and the lower threaded ends of these screws are received in threaded recesses provided in the valve body 1. It will be seen that tightening the fastening screws 78 clamps the magnets 77 between the lower and upper pole pieces 71 and 73, respectively, and securely mounts the whole motor assembly on the valve body. The coil 70 is shown as having taps with leads extending to terminals 80, represented diagrammatically in FIG. 1.

The torque motor and the associated hydraulic amplifier means are enclosed by an inverted cup-shaped cover 81 having an outwardly extending attaching flange 82 at its lower end. A plurality of screws 83, extending through holes in this attaching flange, mount the cover 81 on the valve body. Thus, it will be seen that the torque motor is housed in a dry compartment completely isolated from the hydraulic fluid.

The torque motor 30 has permanent magnetic means provided by the permanent magnets 77 and electromagnetic means provided by the coil 70, the magnetomotive effect of both of which are concentrated by the pole pieces 71 and 73. The magnetomotive force of both types of magnetic means acts in the air gaps 75 and 76 and upon the armature plate 63 which extends through these air gaps. This armature plate is reactive to the magnetomotive force, being constructed of a magnetically permeable material, and when displaced from a perfectly centered position is attracted toward the pole piece to which it is closer.

It is an important feature that when the coil 70 is not energized, the magnetomotive force of the permanent magnets 77, acting through the air gaps 75 and 76, will apply a couple on the pressure regulator member 31 which is opposed and substantially counterbalanced by the couple applied to this member by the sleeve member 50 due to the inherent resistance to bending or flexure of its thin walled tube part 54. In other words, oscillatory movement of the pressure regulator member 31 in a vertical plane about the sealed and frictionless pivot provided by the engagement of the plug portion 60 of this member and the mouth portion of the bore 56 of the sleeve member 50, produces a bending of the thin walled tubular portion 54 of this sleeve member. The resistance to such bending imposes a couple or torque upon the member 31 and the thin walled tube 54 is so designed that it has a spring rate or force-deflection ratio which is approximately equal and opposite to the armature rate within the operating range in the air gaps, the armature rate being the force-deflection ratio resulting from the action of the magnetic field on the armature due solely to the permanent magnets 77. The operating range is centered at the center of the air gaps 75 and 76 and extends approximately half-way from the centers toward both poles and is actually a matter of only a few thousandths of an inch movement. Means (not shown) for centering or adjusting the initial position of the armature in the air gaps may be provided, but, since the aforementioned spring and armature rates are approximately equal, the armature may be positioned anywhere in its operative range of movement and will stay there as long as the electromagnetic means remain de-energized. Thus, when no electrical signal is applied to the motor, the pressure regulator member 31 will be positioned hydraulically so that the clearances between the flapper faces 59 and the respective mouth openings of the nozzles 32 and 33 are such as to produce pressure drops across the annular orifices provided therebetween which, with the pressure drops across the associated restrictions 39 and 43 in the fluid lines, will produce equal pressures in the chambers 34 and 35.

However, when an electrical signal is impressed upon the coil 70, the magnetomotive force increases at the air gaps 75 and 76 and a couple of increased magnitude is applied to the pressure regulator member 31. This couple of increased magnitude moves the flapper either up or down, depending upon the sense of the signal impressed upon the coil 70, so as to decrease the clearance between the flapper and one of the nozzles while increasing the clearance between the flapper and the other nozzle. The reduction in size of one annular orifice and the enlargement of the other produces a pressure differential in the nozzles 32 and 33 and hence in the chambers 34 and 35 and operates to apply hydraulically a torque on the flapper to counter-balance the electromagnetically induced torque thereon and this differential pressure also shifts the valve spool 11 until a force balance is reached with the spring assemblies 15 and 16. In order to maintain the required pressure differential while fluid is flowing into the spool end chamber subjected to the higher pressure, the clearance between the flapper and the associated nozzle will be less than after the flow ceases and a static condition is reached insofar as the spool end chambers are concerned at which time the said flapper clearance will increase to maintain the proper pressure differential. In other words, the pressure drop across the annular discharge orifice of each nozzle is a function of the fluid supply to such nozzle and the sizes of these orifices will be self-adjusting to produce the required pressure differential for a given signal input to the actuating motor under conditions of either variations in supply pressure at the port 2 or flow into or out of the end chambers 34 and 35 during movement of the valve spool 11.

Cancellation of the permanent magnet torques and flexure tube torques results in gain, i.e. a certain differential pressure per milliampere of signal input throughout the operative range of movement of the pressure regulator member 31. Since the hydraulic amplifier will attempt to maintain the required pressure differential independent of flow variations or loading, or, conversely, will attempt to produce a flow into a load sufficient to maintain the called for differential pressure, a torque balance on the pressure regulator member is obtained which is independent of supply pressure variation and this results in high frequency response.

It will be seen that it is important that the flapper and armature be constructed so as to move as a rigid beam member in order to eliminate inherent spring forces being generated due to flexure of the beam member within itself. The construction of the pressure regulator member 31 described herein provides such a rigid member.

Assuming that the coil 70 is energized with a signal so as to move the reduced right end portion of the flapper upwardly toward the nozzle 32 and away from the nozzle 33, it will be seen that a pressure differential is developed in the chambers 34 and 35 with the chamber 34 having the higher pressure. A higher pressure in the chamber 34 than in the chamber 35 will result in a shift of the valve spool 11 to the right as viewed in FIG. 1 thereby connecting the pressure supply port 2 with the control port 3 and connecting the drain port 5 with the control port 4.

Assuming, on the other hand, that the sense of the electrical signal impresse upon the coil 70 is such as to move the reduced right end portion of the flapper downwardly toward the lower nozzle 33, a pressure differential will be established in the chambers 34 and 35 with the chamber 35 having the higher pressure. This results in a shift of the valve spool 11 to the left as viewed in FIG. 1 so as to connect the pressure port 2 with the control port 4 and simultaneously establish communication between the drain port 5 and the control port 3.

It will be seen that the higher the strength of the electrical signal, the greater the electromagnetically induced couple applied to the pressure regulator member 31 and hence the higher the pressure differential in the nozzles 32 and 33 required in order to provide a hydraulically induced torque balance on this member. This results in a pressure differential in the chambers 34 and 35 in direct proportion to the strength of the electrical signal, since the armature rate induced by the permanent magnets is approximately equal and opposite the spring rate of the flexure tube.

From the foregoing, it will be seen that the present invention provides, in an electrically operated fluid control servo valve, a polarized electrical force motor section sealed from a fluid section by a flexure member on which is mounted a rigid armature member movably arranged between the spaced pole pieces of the motor, permanent magnetic and electromagnetic means being associated with such pole pieces. Pivotal movement of the armature member, induced by electrical input to the motor, is permitted by flexing of the flexure member and such movement controls the operation of fluid flow nozzle means arranged in the fluid section. The invention is particularly applicable to servo valves having a force balanced fluid amplifier with a rate cancelled first stage in which the armature member is part of a rigid pressure regulator structure having a flapper part movably arranged in the fluid section between a pair of spaced nozzles, the flexure member being designed such that its spring rate is substantially cancelled by the negative force gradient of the permanent magnet, i.e. the magnetomotive effect thereof, whereby pressure differential in the nozzle chambers is proportional to the electrical input to the valve.

The present invention in its embodiment specifically described, therefore, provides a dry motor, proportional type, electrically actuated, hydraulic, four-way valve featuring characteristics of high dynamic response, sensitivity, linearity, reliability, small size and low weight. However, it is to be understood clearly that the invention is not only applicable to the particular type of electro-hydraulic servo valve illustrated in the drawing and described, but has general applicability to any fluid control valve having a valve spool which is moved in proportional response to mechanical movement transmitted from a dry region to a pressurized fluid filled region through the instrumentality of a rigid beam member mounted on a flexure tube. The scope of the invention is to be measured by the appended claims.

I claim:

1. In an electro-hydraulic servo valve having a body, a recess in said body, a pair of oppositely disposed nozzles arranged on said body so as to introduce fluid into said recess, a tubular sleeve member having an outwardly extending annular collar at one end, an outwardly extending annular attaching flange at its opposite end and an intermediate cylindrical section of reduced wall thickness which is flexible, said attaching flange being fastened to said body so as to cover the outer end of said recess with the interior of said sleeve member in communication with said recess and jointly providing therewith a sump chamber a flapper arranged in said sump chamber and having a cylindrical bar portion, opposite and parallel flat faces at one end of said bar portion and arranged between said nozzles to provide variable annular orifices which discharge fluid into said chamber, an enlarged cylindrical plug portion at the other end of said bar portion and plugging the end of said sleeve member provided with said collar, said flapper being further enlarged adjacent said plug portion to provide a shoulder which abuts the end face of said collar and an integral plate extending outwardly from said further enlargement and having opposite and parallel flat sides which are parallel with said flat faces, and an actuating motor for which said plate serves as the armature, whereby said motor is isolated from said chamber and said flapper can have pivotal movement in a plane normal to said flat faces and sides due to flexing of said sleeve member in order to regulate the fluid pressures in said nozzles in proportional response to an electrical signal impressed on said motor.

2. In an electrically operated servo valve, the combination comprising a polarized electrical force motor section including spaced pole pieces, a rigid armature member movably arranged between said pole pieces, a flexure tube mounting said armature member and permitting pivotal movement thereof, and a fluid section including fluid flow means operatively responsive to the pivotal movement of said armature member, said flexure tube sealing said motor section from said fluid section.

3. In an electrically operated servo valve, the combination comprising a polarized electrical force motor section including spaced pole pieces, a rigid armature member movably arranged between said pole pieces, a flexure tube mounting said armature member and permitting pivotal movement thereof, and a fluid section including fluid flow nozzle means operatively responsive to the pivotal movement of said armature member, said flexure tube sealing said motor section from said fluid section.

4. In an electrically operated servo valve, the combination comprising a polarized electrical force motor section including spaced pole pieces, a rigid armature member movably arranged between said pole pieces, a flexure tube mounting said armature member and permitting pivotal movement thereof, and a fluid section including fluid flow variable orifice means operatively responsive to the pivotal movement of said armature member, said flexure tube sealing said motor section from said fluid section.

5. In an electrically operated servo valve, the combination comprising a polarized electrical force motor section including spaced pole pieces, a rigid armature member movably arranged between said pole pieces, a flexure tube having an end mounting said armature member and permitting pivotal movement thereof, and a fluid section including fluid flow nozzle means operatively responsive to the pivotal movement of said armature member, said flexure tube sealing said motor section from said fluid section.

6. In an electrically operated servo valve, the combination comprising a polarized electrical force motor section including spaced pole pieces, a fluid section including means for discharging fluid, a rigid pressure regulator member associated with said means and having an armature part movably arranged between said pole pieces, and a flexure tube mounting said pressure regulator member and permitting pivotal movement thereof, said flexure tube sealing said motor section from said fluid section.

7. In an electrically operated servo valve, the combination comprising a polarized electrical force motor section including spaced pole pieves, a fluid section including means for discharging fluid, a rigid pressure regulator member associated with said means and having an armature part movably arranged between said pole pieces, and a flexure tube mounting said pressure regulator member and permitting pivotal movement thereof, said flexure tube sealing said motor section from said fluid section, the space between said pole pieces being free of any part of said flexure tube.

8. In an electrically operated servo valve, the combination comprising a polarized electrical force motor section including spaced pole pieces and permanent magnet means associated with said pieces, a fluid section including means for discharging fluid, a rigid pressure regulator member associated with the last mentioned means and having an armature part movably arranged between said pole pieces, and a flexure tube mounting said pressure regulator member and permitting pivotal movement thereof, said flexure tube sealing said motor section from said fluid section, the spring rate of such mounting of said pressure regulator member being substantially cancelled by the negative force gradient of said permanent magnet means.

9. In an electrically operated servo valve, the combination comprising a polarized electrical force motor section including spaced pole pieces and permanent magnet means associated with said pieces, a fluid section including a pair of fixed, opposing and spaced nozzles for discharging fluid, a rigid pressure regulator member having a flapper part and an armature part, said flapper part being movably arranged between said nozzles, said armature part being movably arranged between said pole pieces, and a flexure tube mounting said pressure regulator member and permitting pivotal movement thereof and connected thereto intermediate its said flapper and armature parts, said flexure tube sealing said motor section from said fluid section, the spring rate of such mounting of said pressure regulator member being substantially cancelled by the negative force gradient of said permanent magnet means, whereby pressure differential in the nozzle chambers is proportional to the electrical input to the valve.

10. In an electrically operated servo valve, the combination comprising a polarized electrical force motor section including spaced pole pieces and permanent magnet means associated with said pole pieces, a fluid section including a pair of fixed, opposing and spaced nozzles for discharging fluid, a flexure tube sealing said motor section from said fluid section, a flapper carried by said tube and movably arranged between said nozzles, an armature carried by said tube and movably arranged between said pole pieces, said flapper and armature being rigid with respect to each other upon pivotal movement permitted by flexing of said tube, the spring rate of said flexure tube being substantially cancelled by the negative force gradient of said permanent magnet means, whereby pressure differential in the nozzle chamber is proportional to the electrical input to the valve.

11. In an electrically operated servo valve, the combination comprising a polarized electrical force motor section including spaced pole pieces and permanent magnet means associated with said pieces, a fluid section including a pair of fixed, opposing and spaced nozzles for discharging fluid, a rigid pressure regulator member having a flapper part and an armature part, said flapper part being movably arranged between said nozzles, said armature part being movably arranged between said pole pieces, and a flexure tube mounting said member and permitting pivotal movement thereof and connected thereto intermediate its said flapper and armature parts and surrounding said flapper part in spaced relation thereto, said flexure tube sealing said motor section from said fluid section, the spring rate of such mounting of said member being substantially cancelled by the negative force gradient of said permanent magnet means, whereby the pressure differential in the nozzle chambers is proportional to the electrical input to the valve.

12. A pilot valve for control of a servo valve of the type comprising a body having a longitudinal bore and a nozzle chamber, a spool reciprocally mounted in said bore, and a pressure chamber at each side of the spool, said pilot valve comprising two oppositely arranged nozzles carried by said body and disposed in said nozzle chamber, each nozzle being in communication with one of said pressure chambers, a pair of opposed electromagnetic means carried by said body having a magnetic gap therebetween, a flexible spring metal tube connected in fluid-sealed relation at one end to said body, a flapper valve assembly carried by said tube adjacent its other end and formed with a stem portion extending through said tube, said flapper valve assembly including a portion extending exteriorly from said other end of said tube into operative position between said pair of opposed electromagnetic means, said stem portion being formed with a substantially flat tip normally disposed in a centered position between said nozzles for oscillating movement relative thereto, said flexible tube comprising the sole means spring-biasing said stem towards nozzle-centered position, controlling oscillations thereof and returning said stem to said centered position upon lapse of any biasing signal to said electromagnetic means, while serving as a fluid seal sealing the magnetic gap of said electromagnetic means from oil in the nozzle chamber of the mechanism.

13. A pilot valve for a servo valve mechanism including a body, said pilot valve comprising a flexible tube carried by said body in fluid-sealed relation therewith, two oppositely directed fluid-pressure nozzles carried by said body, an oscillating armature unit operably carried by said tube, said armature unit extending through said tube in fluid sealed relation therewith and having a paddle portion extending between said nozzles and normally centered relative thereto, said unit also including an outwardly extending lever portion on the side of said tube opposite said nozzles, and an electric force motor means having a magnetic gap in which a part of the lever portion is operably disposed, said motor means being selectively operable by biasing signals to rock said paddle portion into variable throttling relation with said nozzles, said tube serving as a fluid seal between said nozzles and said magnetic gap of said motor means, said tube comprising the sole means for centering the paddle portion upon cessation of any biasing signal to said motor means and for controlling rocking of said paddle portion.

14. In an electrically operated servo valve, the combination comprising a polarized electrical force motor section including spaced pole pieces, an armature member movably arranged between said pole pieces, a flexure tube mounting said armature member exteriorly of said tube and permitting pivotal movement of said armature member, and a fluid section on the other side of said tube and including means for producing a fluid pressure differential in response to the pivotal movement of said armature member, said tube sealing said motor section from said fluid section, the interior of said tube communicating with fluid handled by said means whereby said tube tends to be placed in tension by the pressure of fluid within said tube.

15. In an electrically operated servo valve, the combination comprising a polarized electrical force motor section including spaced pole pieces, an armature member movably arranged between said pole pieces, a flexure tube mounting said armature member exteriorly of said tube and permitting pivotal movement of said armature member, and a fluid section on the other side of said tube and including a slidable valve spool and means for producing a fluid pressure differential on the ends of said valve spool in response to the pivotal movement of said armature member and also including means providing a sump chamber communicating with the interior of said tube, said tube sealing said motor section from said fluid section.

16. In an electrically operated servo valve, the combination comprising a body having a wall imperforate but for an opening therein, a polarized electrical force motor on one side of said wall and including spaced pole pieces, an armature member movably arranged between said pole pieces, an imperforate flexure tube closed at one end and open at its opposite end and mounting said armature member exteriorly of said tube on said one end thereof and permitting pivotal movement of said armature member, said tube being arranged with its said opposite end covering said opening whereby the interior of said tube communicates with said opening through the open end of said tube, means on the other side of said wall for producing a fluid pressure differential in response to the pivotal movement of said armature member and including an element extending through said opening into the interior of said tube, and means sealingly securing said opposite end of said tube to said wall.

17. In an electrically operated servo valve, the combination comprising a polarized electrical force motor including spaced pole pieces, a flexure tube, an armature member movably arranged between said pole pieces, means mounting said armature member on the external side of said tube on one end thereof, said flexure tube permitting pivotal movement of said armature member, and means on the internal side of said tube for producing a fluid pressure differential in response to the pivotal movement of said armature member and including an element arranged within said tube in spaced relation to the side wall thereof and movable with said armature member.

18. In an electrically operated servo valve, the combination comprising a polarized electrical force motor including spaced pole pieces, a flexure tube, an armature-flapper member including an armature part movably arranged between said pole pieces and also including a flapper part, means mounting said armature-flapper member on one end of said tube so that said armature part is arranged on the outside of said tube and said flapper part is arranged on the inside of said tube, a slidable valve spool, and fluid discharging opposed nozzles on opposite sides of said flapper part and operatively associated with said valve spool and cooperable with said flapper part to produce a fluid pressure differential on the ends of said valve spool to drive the same in response to electrical input to said motor, said tube sealing said motor from contact with fluid discharged by said nozzles.

References Cited by the Examiner

UNITED STATES PATENTS

| | | | |
|---|---|---|---|
| 160,703 | 3/1875 | Painter | 74—18.1 |
| 1,173,038 | 2/1916 | Roschanek | 74—18.1 |
| 1,827,560 | 10/1931 | Binkley | 74—18.1 |
| 1,868,064 | 7/1932 | Horn | 74—18.1 |
| 1,992,048 | 2/1935 | Temple | 137—82 |
| 2,154,292 | 4/1939 | Taleaferro | 74—18.1 |

(Other references on following page)

UNITED STATES PATENTS

| | | | |
|---|---|---|---|
| 2,457,320 | 12/1948 | Rosenberger | 74—18.1 |
| 2,599,159 | 6/1952 | Breedlove | 137—85 |
| 2,675,652 | 4/1954 | Chiappulini | 121—45 |
| 2,738,772 | 3/1956 | Richter | 121—46.5 |
| 2,767,689 | 10/1956 | Moog | 137—82 |
| 2,781,665 | 2/1957 | Li | 74—18.1 |
| 2,790,427 | 4/1957 | Carson | 121—46.5 |
| 2,824,574 | 2/1958 | Place | 121—46.5 |
| 2,835,265 | 5/1958 | Brandstadter | 137—623 |

FOREIGN PATENTS 562,645  7/1944  Great Britain.

ISADOR WEIL, *Primary Examiner.*

RALPH H. BRAUNER, KARL J. ALBRECHT, ALAN COHAN, *Examiners.*

S. LEVIN, L. WEINSTEIN, *Assistant Examiners.*